United States Patent
Lazaro

(10) Patent No.: US 11,866,840 B2
(45) Date of Patent: Jan. 9, 2024

(54) NON-UNIFORM CIRCULAR MOTION FOR ELECTROPLATING BARRELS AND METHODS OF USE

(71) Applicant: Hardwood Line Manufacturing Co., Chicago, IL (US)

(72) Inventor: Anton E. Lazaro, Evanston, IL (US)

(73) Assignee: Hardwood Line Manufacturing Co., Chicago, IL (US)

( * ) Notice: Subject to any disclaimer, the term of this patent is extended or adjusted under 35 U.S.C. 154(b) by 303 days.

(21) Appl. No.: 16/794,504

(22) Filed: Feb. 19, 2020

(65) Prior Publication Data

US 2020/0299856 A1  Sep. 24, 2020

Related U.S. Application Data

(60) Provisional application No. 62/822,346, filed on Mar. 22, 2019.

(51) Int. Cl.
C25D 17/18 (2006.01)
F16H 1/06 (2006.01)

(52) U.S. Cl.
CPC .............. *C25D 17/18* (2013.01); *F16H 1/06* (2013.01)

(58) Field of Classification Search
None
See application file for complete search history.

(56) References Cited

U.S. PATENT DOCUMENTS

| | | | | |
|---|---|---|---|---|
| 2,835,664 A * | 5/1958 | Belke | ............. | C25D 17/18 |
| | | | | 204/213 |
| 3,294,663 A * | 12/1966 | Lazaro | ............. | C25D 17/22 |
| | | | | 366/208 |
| 3,862,896 A | 1/1975 | Singleton | ............. | 204/198 |
| 3,950,939 A | 4/1976 | Meisner | ............. | 58/125 |
| 3,971,167 A | 7/1976 | Van Moppes | ............. | 51/164 |
| 5,030,330 A | 7/1991 | Lazaro | ............. | 204/14.1 |
| 2008/0141879 A1 | 6/2008 | Niemiro et al. | ............. | 101/217 |
| 2010/0229665 A1 | 9/2010 | Ambardekar | ............. | 74/332 |
| 2012/0244984 A1 | 9/2012 | Yamamoto et al. | ............. | 475/162 |
| 2013/0280553 A1 | 10/2013 | Lee et al. | ............. | 428/656 |
| 2016/0299413 A1 | 10/2016 | Fee | ............. | G03B 17/568 |
| 2018/0180837 A1 | 6/2018 | Shiraishi | ............. | G02B 7/09 |

FOREIGN PATENT DOCUMENTS

CN  103267106 A  *  8/2013
DE  102016216361 A1  *  3/2018

OTHER PUBLICATIONS

Brown, Henry. "Five Hundred and Seven Mechanical Movements" published 1868 and retrieved via website http://507movements.com/mm_191.html (Year: 1868).*

* cited by examiner

*Primary Examiner* — Louis J Rufo
(74) *Attorney, Agent, or Firm* — Rosenbaum IP, P.C.; David G. Rosenbaum

(57) ABSTRACT

Provided herein are systems, methods and apparatuses for Non-Uniform Circular Motion for Electroplating Barrels and methods of use. Various system, parts, and parameters are used to maintain Non-Uniform Circular Motion for Electroplating Barrels for uniformity.

12 Claims, 4 Drawing Sheets

NON-UNIFORM CIRCULAR MOTION FOR ELECTROPLATING BARRELS AND METHODS OF USE

CROSS-REFERENCE TO RELATED APPLICATIONS

The present application claims priority to U.S. provisional application Ser. No. 62/822,346, filed Mar. 22, 2019, herein incorporated by reference in its entirety.

BACKGROUND

The invention generally relates to non-uniform circular motion and more particularly to non-uniform circular motion for electroplating barrels.

In a conventional cylinder, the load travels along a fixed rotational path around the inside of the cylinder wall. Some plating parts that require extremely close tolerances, while still having faster and more consistent plating. Improvements in the load distribution and exposures to all sides of all parts are needed for a more uniform amount of current and plating deposit.

The present invention attempts to solve these problems, as well as others.

SUMMARY OF THE INVENTION

Provided herein are systems, methods and apparatuses for a Non-Uniform Circular Motion system and methods of use. An Non-Uniform Circular Motion system is disclosed and generally comprises an electrical circuit operably coupled to a motor and a battery, wherein the A non-uniform circular motion system is disclosed herein and comprises: an electrical circuit operably coupled to a motor, wherein the electrical circuit provides a non-uniform circular motion for an electroplating barrel; the motor operably coupled to a first gear, the first gear rotatably drives a second gear; and the second gear operably coupled with a first nautilus gear and the first nautilus gear rotatably coupled with a second nautilus gear; the second nautilus gear operably coupled with an electroplating barrel, such that the rotation of the second nautilus gear rotates the electroplating barrel in a non-uniform circular motion.

A method of providing non-uniform circular motion to an electroplating barrel is disclosed herein and comprises: providing a motor to deliver rotational force; delivering the motor's rotational force to a first gear, and rotatably driving a second gear; and operably coupling the second gear with a first nautilus gear and rotatably coupling the first nautilus gear with a second nautilus gear; operably coupling the second nautilus gear with an electroplating barrel, and rotating the second nautilus gear and the electroplating barrel in a non-uniform circular motion.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE INVENTION

Figure 1:
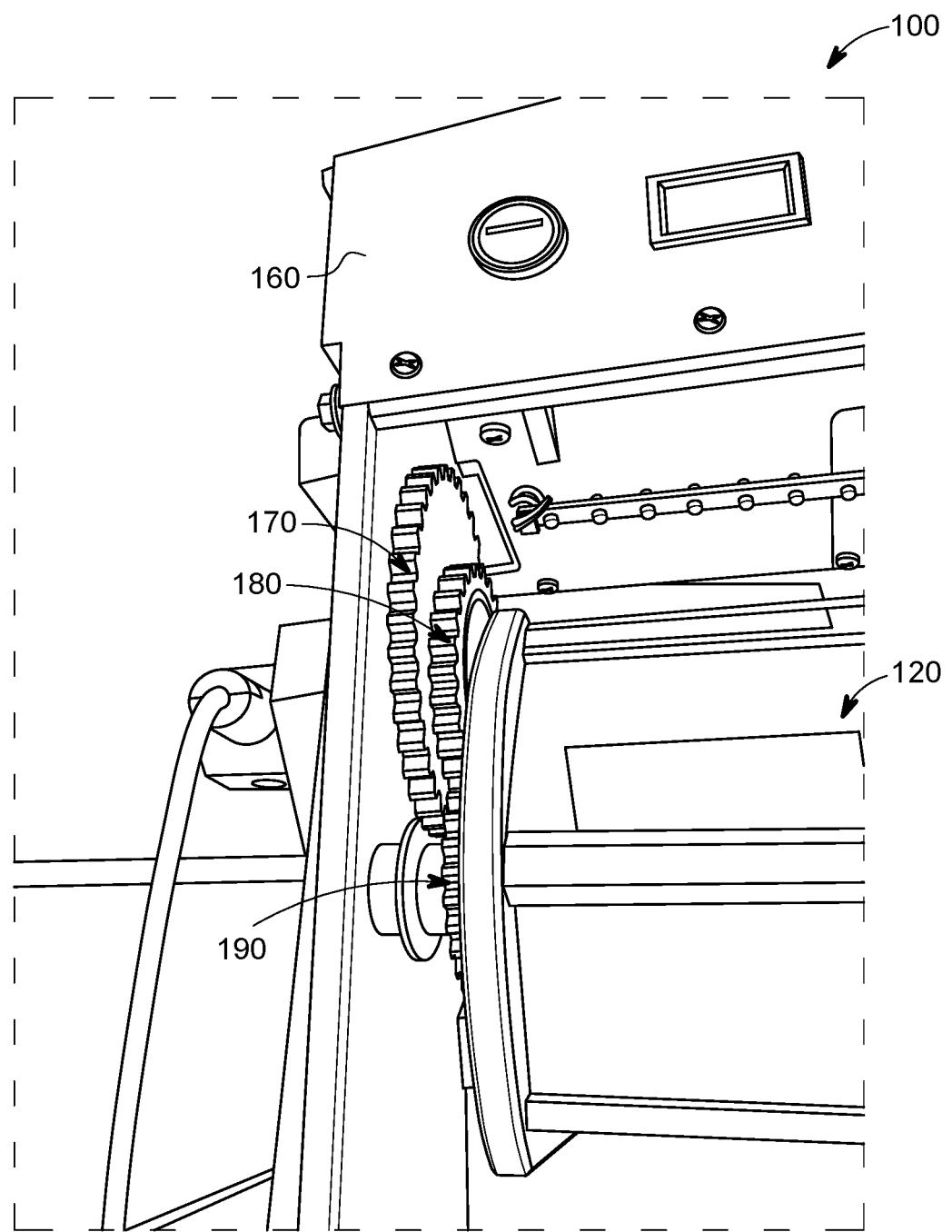
FIG. 1 is a perspective view of the electroplating barrel including the non-uniform circular motion system.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any nonclaimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the mechanical and electrical arts.

Generally speaking, the non-uniform circular motion system 100 comprises an electroplating barrel 120 that is rotatably driven and it is journaled by means of bearing members that are disposed in the center of the end plates 124, 126 and are rotatably driven by a motor 150 and gears 152 as seen in U.S. Pat. No. 4,740,286 as well as any number of previously built electroplating barrels. Generally, the electroplating barrels 120 reside in a bath of electrolyte solution of conventional design so as to permit the interior of the electroplating barrel 120 to be substantially filled with such solution, the solution passing into electroplating barrel 120 through the perforations in the panels of the electroplating barrel 120. An electrical potential is applied to the parts loaded in the barrel by means of the cathode points which are accessed to the barrel by means of insulated conductors that protrude through the bearing members of the end plates 124 and 126 and are connected to electrical power generating means in accordance with known ways for providing electroplating action to articles within the electroplating barrel 120.

Non-uniform circular rotation of a barrel used for metal finishing i.e. plating, electroless process, cleaning, phosphating or black oxide is critical for uniformity of finish on each part. Not turning during critical tank positions will not allow liquid to reach all areas of the parts thus causing rejects. The rotational means of the Barrel cylinder is generated either from a motor attached to the barrel with or by the barrel making mechanical contact by means of an external drive shaft which extends out to a gear which mates with a gear on the tank of which is driven by a gear motor. Motors on the barrel require electrical power brought to the motor, according to one embodiment.

The electroplating barrel 120 is operably coupled with a motor 150 to provide the torque and rotating power to the electroplating barrel 120. In one embodiment, motor 150 is operably coupled to a first gear 170 which then rotatably drives a second gear 178. The second gear 178 is operably coupled with a first nautilus gear 180 and the first nautilus gear 180 is rotatably coupled with a second nautilus gear 190. The second nautilus gear 190 is operably coupled with the electroplating barrel, such that the rotation of the second nautilus gear 190 rotates the electroplating barrel 120.

Figure 2:
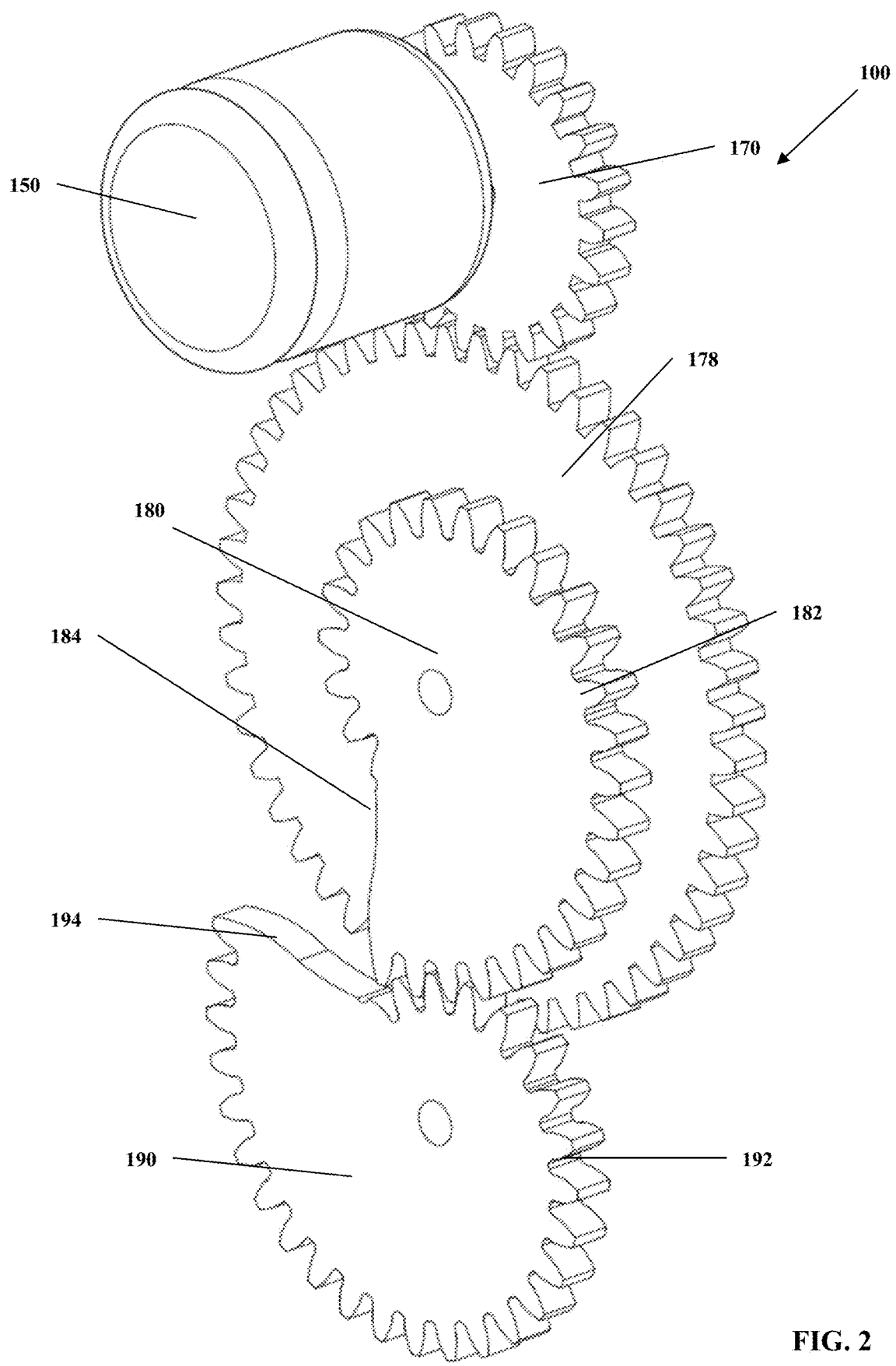
FIG. 2 is a side view of the non-uniform circular motion system showing the first and second gears operably coupled with the first and second nautilus gears.

As shown in FIG. 2, the first nautilus gear 180 includes a first spiral side 182 and a first flat side 184. The second nautilus gear 190 includes a second spiral side 192 and a second flat side 194. The first and second spiral side 182, 192 are designed from the Fibonacci spiral and must be identical. The first and second flat sides 184, 194 are nearly flat and identical. The result is that at the very end of a rotation, the first flat side 184 and the second flat side 194 hit against each other before the next turn starts. If the first nautilus gear is moving at a constant speed, the second nautilus gear 190 will speed up and slow down during the course of its rotation based on the Fibonacci curves of the two sets. The speed of speeding up may be between about 1 RPM and about 10 RPM, while the speed of slowing down may be between about 1 RPM and about 10 RPM.

This allows the electroplating barrel to rotate slow during the rotation along the second spiral side 192 and then speed up once rotating along the second flat side 194. Alternatively, the first flat side 184 and the second flat side 194 are curved at an angle greater than about 2-10 degrees.

An electrical circuit 160 provides a voltage to the motor 150 in order to provide a constant rotational motion by the motor 150 for the electroplating barrel 120, according to one embodiment. A constant rotational motion or RPM is required for proper electroplating barrel operation. Alternatively, the electrical circuit can provide erratic or non-uniform voltage, according to one embodiment. Electronic circuits usually use direct current sources. The load of an electronic circuit may include a few resistors, capacitors, all connected together. Or an electronic circuit can be complicated, connecting thousands of resistors, capacitors, and transistors. It may be an integrated circuit such as the microprocessor in a computer or controller.

The electroplating barrel 120 is operably coupled to the electrical circuit 160 that pulls amps from the battery and providing a voltage to the motor to provide the rotational movement of the first gear and RPM to the electroplating barrel. A rotation along the second spiral side 192 guarantees plating uniformity while the rotation along the second flat side 194 is a non-uniform and high speed plating. The RPM may range from about 2 to about 10 RPM; alternatively between about 1 to about 100 RPM. The constant RPM or non-constant RPM may be selected based upon the type of plating process being performed. The plating process include, but are not limited to: Copper plating, nickel plating, electroless nickel phosphorous, palladium plating, palladium-nickel, silver plating, tin, tin-lead, tin-zinc, zinc electroplating, zinc-nickel, soft and cobalt hardened gold including the SPC plating array.

In one embodiment, the non-uniform circular motion system the motor will be able to achieve angular velocity (speed) changes by accepting programmed signals from a motor controller.

The first and second nautilus gears 180, 190 may be generated by applying a cosine gear and pitch function along the curve of a logarithmic spiral using a growth rate of about 1.17. Varying either the length of the first and second flat sides 184, 194 and varying the logarithmic spiral growth rate of the first and second spiral sides 182, 192 modifies the constant and sped up rotation of the second nautilus gear 190.

The Non-uniform circular motion denotes a change in the speed of rotation moving along the nautilus gears circular path. Since the speed is changing, there is tangential acceleration in addition to normal acceleration. The speed is necessarily given by the angular velocity ($\omega$) in non-uniform circular motion is not constant, as $\omega=v/r$, and v varies and r is the radius.

Figure 3:
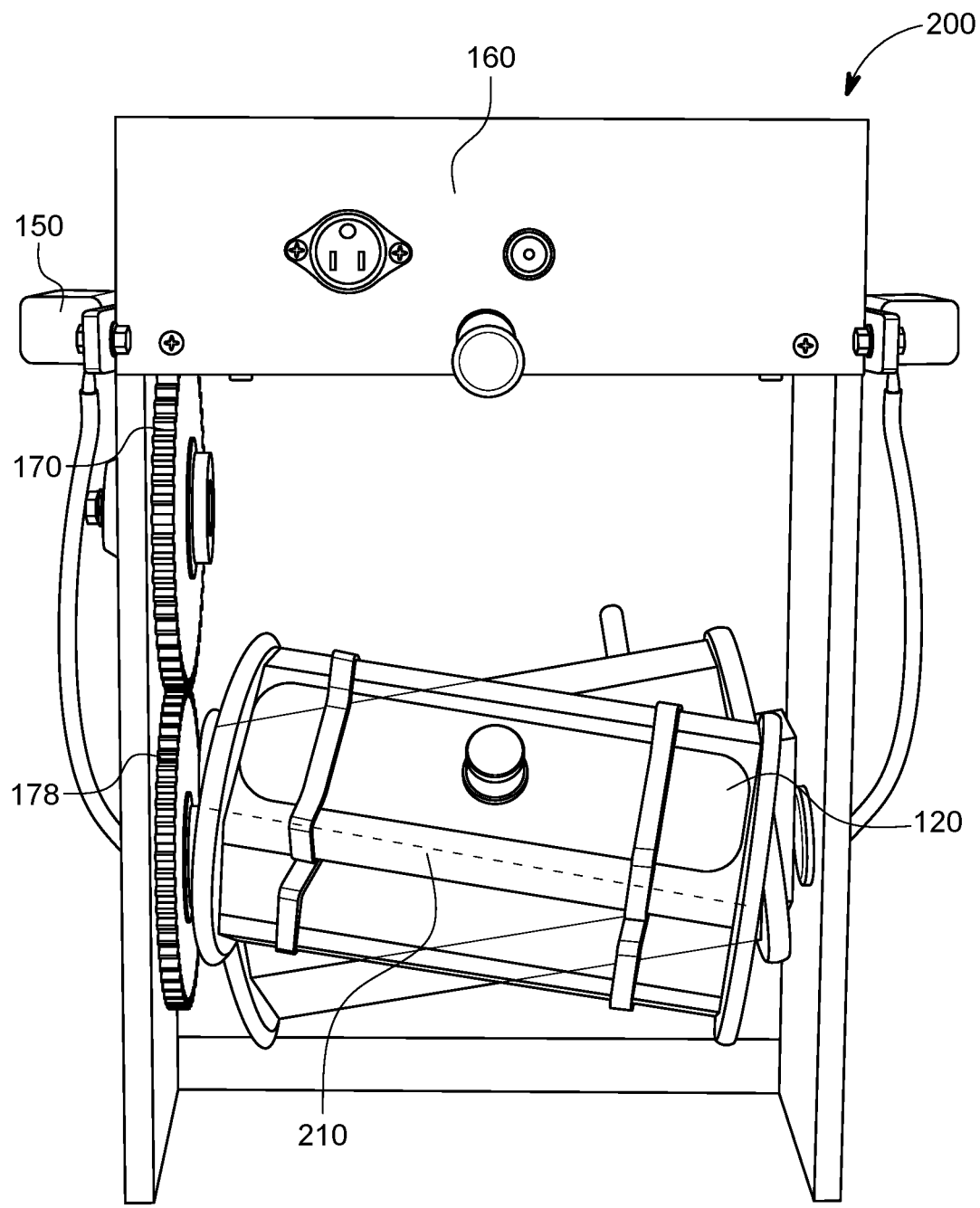
FIG. 3 is a side view of the oscillating system.
Figure 4:
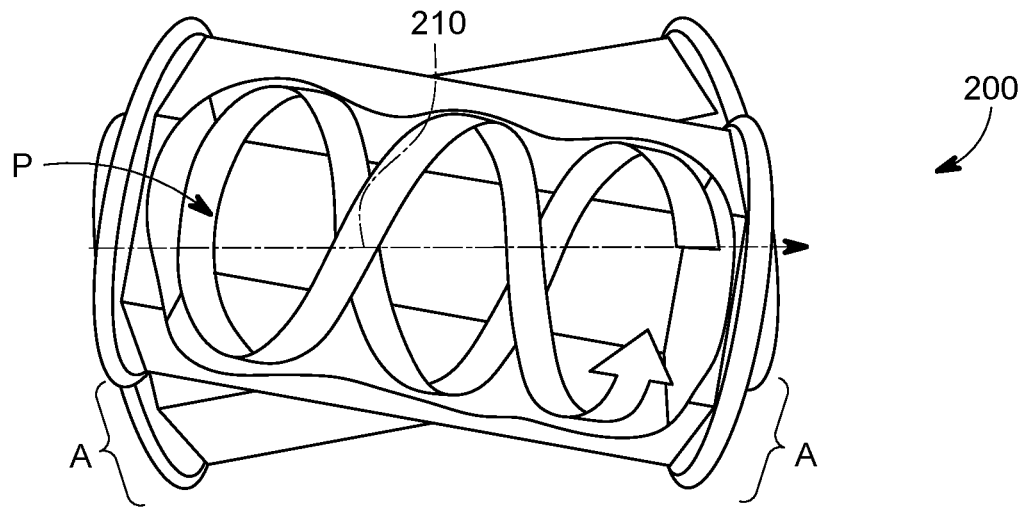
FIG. 4 is a side view of the oscillating Barrel cylinder showing the load distribution during oscillation.
Figure 5:
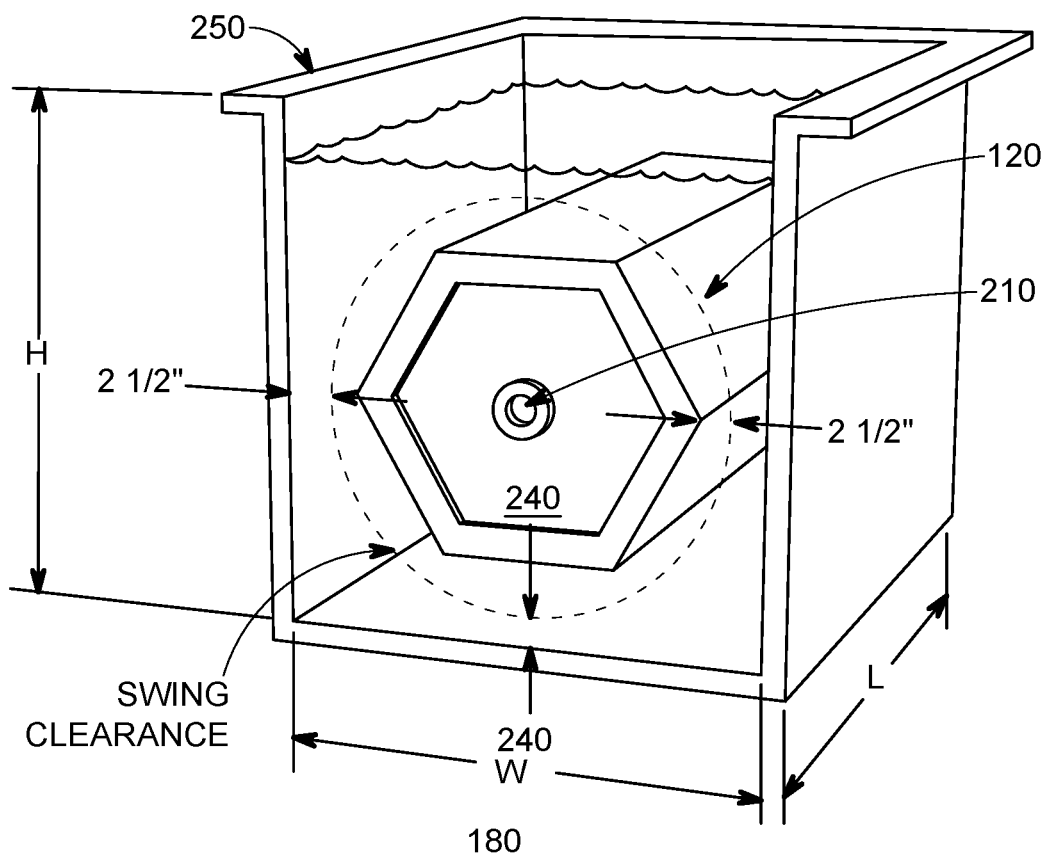
FIG. 5 is a perspective side view of the sizing of the tank for the oscillating system and barrel.

In one embodiment, the non-uniform circular motion system 100 is operably coupled with an oscillating system 200, as shown in FIG. 3. The center axis 210 of the electroplating barrel 120 is offset within the barrel tank by including an off-center gear connection on the second gear 178 for the barrel. The electroplating barrel 120 is a cylinder or barrel cylinder. The resulting "off center" oscillating motion of the electroplating barrel 120 causes a better distribution of parts within the electroplating barrel 120. As a result, the parts achieve more uniform contact with the danglers. This yields less weight variance within the load while reducing the overall plating time. In a conventional barrel, the load travels along a fixed path around the inside of the barrel wall. In an Oscillating barrel, the load travels in a path P that resembles an expanded FIG. 4. This improves the load distribution and exposes all sides of all parts to a more uniform amount of current and plating deposit. The size of the electroplating barrel 120 and its angle of offset A from normal rotation, as shown in FIG. 4, which is dependent on the current swing clearance 240 of the barrel tank 250, as shown in FIG. 5. In order to fit a tilted electroplating barrel 120 with a swing clearance 240, the electroplating barrel 120 size must be slightly reduced. This small loss in volume is more than compensated for by the resulting speed and quality of each run. The angle of offset A may be between about 5 degrees and about 70 degrees; alternatively, between about 10 degrees and about 60 degrees; alternatively between about 15 degrees and 50 degrees. The swing clearance 240 may be between about 1 inch and about 10 inches; alternatively, between about 2 inches and about 8 inches; alternatively, between about 2.5 inches and about 7 inches. The tank includes a width W, a height H, and a length L in which to fit the electroplating barrel 120 or other Barrel cylinder. The electronic circuit 160 may monitor the oscillation of the oscillating system 200 to ensure the angle of offset A maintains proper oscillation.

Motor

In one embodiment, the motor is a DC motor. An electric motor is an electrical machine that converts electrical energy into mechanical energy. Most electric motors operate through the interaction between an electric motor's magnetic field and winding currents to generate force. Electric motors can be powered by direct current (DC) sources, such as from batteries, motor vehicles or rectifiers, or by alternating current (AC) sources, such as from the power grid, inverters or generators. Electric motors operate on three different physical principles: magnetic, electrostatic and piezoelectric. By far the most common is magnetic. All self-commutated DC motors run on DC electric power. Most DC motors are small permanent magnet (PM) types. They contain a brushed internal mechanical commutation to reverse motor windings' current in synchronism with rotation. In magnetic motors, magnetic fields are formed in both the rotor and the stator. The product between these two fields gives rise to a force, and thus a torque on the motor shaft. One, or both, of these fields must be made to change with the rotation of the motor. This is done by switching the poles on and off at the right time, or varying the strength of the pole.

Mathematical formulas and program modules were developed to factor in all critical areas needed to guarantee operation sent by a motor controller through programmed signals or program modules. It is then by design, constraints, and factors that a Non-uniform circular motion is maintained over a specified period of time by the motor controller through specific input and output parameters. The Non-uniform circular motion system 100 includes a unique circuitry that allows for a Non-uniform circular motion either by way of the nautilus gears, regular gearing, or oscillating system, or a combination thereof.

Generally, mathematical formulas and program modules used by the motor controller include routines, programs, components, data structures, etc., that perform particular tasks or implement particular abstract data types by the motor controller. Moreover, those skilled in the art will appreciate that the inventive methods can be practiced with other controller system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The mathematical formulas and program modules used by the motor controller may include constraints provided by customer and engineering design factors to achieve customer constraints and maintain the Non-uniform circular motion over a specified period of time. The constraints used by the motor controller and provided by customer to maintain the Non-uniform circular motion over a specified period of time may include, but are not limited to: Electroplating Cylinder diameter, Barrel Cylinder revolutions per minute, Weight of parts load, Volume of parts load, Interval between battery charges. The engineering design factors used by the motor controller to achieve customer constraints to maintain the Non-uniform circular motion over a specified period of time may include, but are not limited to: Barrel drive gear size, Barrel cylinder gear size, DC volts supplied to motor, Gearmotor nameplate volts, Gearmotor nameplate RPM, Gearmotor nameplate full load amps, Gearmotor nameplate full load torque, Battery pack voltage and ampere hour rating.

Given the Barrel cylinder diameter, the weight of parts of the load, and the volume of the parts of the load and various combinations of barrel drive gear size and barrel cylinder gear size are used by the motor controller to calculate required gearmotor output torque(s) to maintain the Non-uniform circular motion over a specified period of time. The mathematical formulas and program modules used by the motor controller consider the available DC gearmotors with a minimum required output torque at various volts for the DC volts supplied to the motor to maintain the Non-uniform circular motion over a specified period of time. The mathematical formulas and program modules used by the motor controller to maintain the Non-uniform circular motion over a specified period of time use and consider the available DC gearmotors with output speed for the Barrel cylinder revolutions per minute given various barrel drive gear sizes and various barrel cylinder gear sizes. The mathematical formulas and program modules used by the motor controller to maintain the Non-uniform circular motion over a specified period of time use and consider the available DC gearmotors with ampere draw that satisfy the Interval between battery charges given available Battery pack voltage and ampere hour rating. The mathematical formulas and program modules used by the motor controller to maintain the Non-uniform circular motion over a specified period of time use and select the DC gearmotor that satisfies torque, speed and power draw. The mathematical formulas and program modules to maintain the Non-uniform circular motion over a specified period of time select the battery pack(s) to match the Interval between battery charges, the DC volts supplied to the motor, and the Battery pack voltage and ampere hour rating.

The mathematical formulas and program modules to maintain the Non-uniform circular motion over a specified period of time use and specify gears for the Barrel drive gear size and Barrel cylinder gear size, the gearmotor and battery pack to satisfy Barrel Cylinder diameter, Barrel Cylinder revolutions per minute, the Weight of parts load, the Volume of parts load, the Interval between battery charges when DC volts is supplied to the gearmotor.

A method of providing non-uniform circular motion to an electroplating barrel is disclosed herein and comprises: providing a motor to deliver rotational force; delivering the motor's rotational force to a first gear, and rotatably driving a second gear; and operably coupling the second gear with a first nautilus gear and rotatably coupling the first nautilus gear with a second nautilus gear; operably coupling the second nautilus gear with an electroplating barrel, and rotating the second nautilus gear and the electroplating barrel in a non-uniform circular motion. The method of further comprises including a first spiral side and a first flat side with the first nautilus gear; including a second spiral side and a second flat side with the second nautilus gear, and including a Fibonacci spiral for the first and the second spiral side; and including identical first spiral side and the second spiral side.

The method further comprises including identical first and second flat sides, abutting the first flat side and the second flat side against each other before the next rotation starts, moving the first nautilus at a constant speed, and speeding up the second nautilus gear speeds up and slow downing the second nautilus gear during the course of its rotation based on the Fibonacci spiral of the second spiral side.

The method further comprises rotating the electroplating barrel slow during the rotation along the second spiral side and then speeding up the rotation of the second nautilus gear once rotating along the second flat side.

The method further comprises providing a curved first flat side and a curved second flat side. The method further comprises alarming an indicator alarms at a threshold RPM and adjusting the motor RPM for the first gear. The method comprises including the RPM in a range from about 2 to about 10 RPM. The method further comprises offsetting the center axis of the electroplating barrel by including an off-center gear connection on the second gear for the electroplating barrel. The method comprises achieving angular velocity changes of the electroplating barrel by accepting programmed signals from a motor controller.

The method wherein the motor controller includes constraints selected from the group consisting of: Barrel Cylinder diameter, Barrel Cylinder revolutions per minute, Weight of parts load, Volume of parts load, Interval between battery charges; Barrel drive gear size, Barrel cylinder gear size, DC volts supplied to motor, Gearmotor nameplate volts, Gearmotor nameplate RPM, Gearmotor nameplate full load amps, Gearmotor nameplate full load torque, Battery pack voltage and ampere hour rating.

The further comprises calculating a required gearmotor output torques using the Barrel cylinder diameter, a weight of parts of the load, and a volume of the parts of the load, and various combinations of a barrel drive gear size and a barrel cylinder gear size; and the motor controller considers an available DC gearmotor with a minimum required output torque at various volts for the DC volts supplied to the motor to maintain the Non-uniform circular motion over a specified period of time; using the available DC gearmotor with output speed for a Barrel cylinder revolutions per minute given various barrel drive gear sizes and various barrel cylinder gear sizes to maintain the Non-uniform circular motion over a specified period of time; using the available DC gearmotor with ampere draw that satisfy an Interval between battery charges given available Battery pack voltage and an ampere hour rating to maintain the Non-uniform circular motion over a specified period of time; selecting the available DC gearmotor that satisfies torque, speed and power draw to maintain the Non-uniform circular motion over a specified period of time; and selecting a battery pack to match the Interval between a battery charge, the DC volts supplied to the motor, and the Battery pack voltage and ampere hour rating to maintain the Non-uniform circular motion over a specified period of time.

The method further comprises specifying the first and second nautilus gears for the Barrel drive gear size and the Barrel cylinder gear size, the gearmotor and battery pack to satisfy a Barrel Cylinder diameter, a Barrel Cylinder revolution per minute, the Weight of parts load, the Volume of parts load, the Interval between battery charges when a DC volt is supplied to the gearmotor to maintain the Non-uniform circular motion over a specified period of time.

All publications and patent applications mentioned in this specification are herein incorporated by reference to the same extent as if each individual publication or patent application was specifically and individually indicated to be incorporated by reference.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. An electroplating system for non-uniform circular motion of an electroplating barrel, comprising:
   a. a motor coupled to the electroplating barrel and to an electrical circuit that provides electrical energy to the motor;
   b. the motor operably coupled to a first gear, the first gear rotatably drives a second gear; and
   c. the second gear engaged with a first nautilus gear and the first nautilus gear rotatably coupled with a second nautilus gear; the second nautilus gear operably coupled with the electroplating barrel, such that a rotation of the second nautilus gear rotates the electroplating barrel in a non-uniform circular motion.

2. The non-uniform circular motion system of claim 1, wherein the first nautilus gear includes a first spiral side and a first flat side; the second nautilus gear includes a second spiral side and a second flat side, wherein the first and the second spiral side include a Fibonacci spiral and are identical.

3. The non-uniform circular motion system of claim 2, wherein the first and second flat sides are nearly flat and identical, wherein the first flat side and the second flat side hit against each other before a next rotation starts, and when the first nautilus gear is moving at a constant speed, the second nautilus gear speeds up and slows down during a course of its rotation based on the Fibonacci spiral of the second spiral side.

4. The non-uniform circular motion system of claim 3, wherein the electroplating barrel rotates at a first rate during the rotation along the second spiral side and then rotates at a higher second rate once rotating along the second flat side.

5. The non-uniform circular motion system of claim 4, wherein the first flat side and the second flat side are curved.

6. The non-uniform circular motion system of claim 5, wherein an indicator actuates at a threshold rotations per minute and the motor adjusts its rotations per minute.

7. The non-uniform circular motion system of claim 6, wherein the rotations per minute includes a range from about 2 to about 10 rotations per minute; and the speed of speeding up by the second nautilus gear is between about 1 rotations per minute and about 10 rotations per minute, and the speed of slowing down by the second nautilus gear is between about 1 rotations per minute and about 10 rotations per minute.

8. The non-uniform circular motion system of claim 7, wherein a constant RPM is be selected based upon a plating process, wherein the plating process is selected from the group consisting of: Copper plating, nickel plating, electroless nickel phosphorous, palladium plating, palladium-nickel, silver plating, tin, tin-lead, tin-zinc, zinc electroplating, zinc-nickel, and soft and cobalt hardened gold including an SPC plating array.

9. The non-uniform circular motion system of claim 8, wherein a center longitudinal axis of the electroplating barrel is offset from a center rotational axis of the second nautilus gear.

10. An electroplating system for non-uniform circular motion system for driving of an electroplating barrel, comprising:
   a. a motor coupled to the electroplating barrel and to an electrical circuit that provides electrical energy to the motor;
   b. the motor operably coupled to a first gear, the first gear rotatably drives a second gear; and
   c. the second gear engaged with a first nautilus gear and the first nautilus gear rotatably coupled with a second nautilus gear; the second nautilus gear operably coupled with the electroplating barrel, such that a rotation of the second nautilus gear rotates the electroplating barrel in a non-uniform circular motion;
   d. wherein the first nautilus gear includes a first spiral side and a first flat side; the second nautilus gear includes a second spiral side and a second flat side, wherein the first and the second spiral side include a Fibonacci spiral and are identical;
   e. wherein the first flat side and the second flat side hit against each other before a next rotation starts, and when the first nautilus gear is moving at a constant speed, the second nautilus gear speeds up and slows down during a course of its rotation based on the Fibonacci spiral of the second spiral side;
   f. wherein the electroplating barrel rotates at a first rate during the rotation along the second spiral side and then rotates at a higher second rate once rotating along the second flat side; and
   g. wherein a center longitudinal axis of the electroplating barrel is offset from a center rotational axis of the second nautilus gear.

11. The non-uniform circular motion system of claim 10, wherein the rotations per minute includes a range from about 2 to about 10 rotations per minute; and the speed of speeding up by the second nautilus gear is between about 1 rotation per minute and about 10 rotations per minute, and the speed of slowing down by the second nautilus gear is between about 1 rotation per minute and about 10 rotations per minute.

12. The non-uniform circular motion system of claim 10, wherein a constant RPM is be selected based upon a plating process, wherein the plating process is selected from the group consisting of: Copper plating, nickel plating, electroless nickel phosphorous, palladium plating, palladium-nickel, silver plating, tin, tin-lead, tin-zinc, zinc electroplating, zinc-nickel, and soft and cobalt hardened gold including an SPC plating array.

\* \* \* \* \*